(12) United States Patent
Gu

(10) Patent No.: US 11,909,505 B2
(45) Date of Patent: Feb. 20, 2024

(54) USER EQUIPMENT PARAMETER DETERMINATION METHOD AND APPARATUS, AND STORAGE MEDIUM AND BASE STATION

(71) Applicant: SPREADTRUM COMMUNICATIONS (SHANGHAI) CO., LTD., Shanghai (CN)

(72) Inventor: Xiangxin Gu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/271,867

(22) PCT Filed: Jul. 18, 2019

(86) PCT No.: PCT/CN2019/096463
§ 371 (c)(1),
(2) Date: Feb. 26, 2021

(87) PCT Pub. No.: WO2020/042808
PCT Pub. Date: Mar. 5, 2020

(65) Prior Publication Data
US 2021/0194572 A1 Jun. 24, 2021

(30) Foreign Application Priority Data
Aug. 31, 2018 (CN) .......................... 201811012648.5

(51) Int. Cl.
*H04B 7/185* (2006.01)
*H04W 56/00* (2009.01)
(Continued)

(52) U.S. Cl.
CPC ........... *H04B 7/18519* (2013.01); *H04B 7/19* (2013.01); *H04W 56/005* (2013.01);
(Continued)

(58) Field of Classification Search
CPC ... H04B 7/18519; H04B 7/19; H04W 56/005; H04W 56/006; H04W 56/009; H04W 84/06
See application file for complete search history.

(56) References Cited

U.S. PATENT DOCUMENTS

2004/0151143 A1 8/2004 Abdesselem et al.
2004/0192201 A1 9/2004 Febvre et al.
(Continued)

FOREIGN PATENT DOCUMENTS

CN 102088763 A 6/2011
CN 102884752 A 1/2013
(Continued)

OTHER PUBLICATIONS

Interdigital Inc., Thales, "Considerations on Timing Advance for NTN", 3GPP TSG RAN WG1 Meeting #92bis, R1-1804858, Sanya, China, Apr. 16-20, 2018; 3 pages.
(Continued)

*Primary Examiner* — Bailor C Hsu
(74) *Attorney, Agent, or Firm* — CANTOR COLBURN LLP

(57) ABSTRACT

UE parameter determination method and apparatus, storage medium and base station are provided. The method includes: determining a minimum round trip time between each UE in a cell and a satellite; determining frame information of a network-side uplink radio frame based on the minimum round trip time and frame information of a network-side downlink radio frame, where the minimum round trip time is a timing difference by which the network-side uplink radio frame lags behind the network-side downlink radio frame; and determining a UE parameter of each UE based on the network-side uplink radio frame and the network-side downlink radio frame, where UE parameter includes at least one of TA or K2. By the method, an NTN network can be
(Continued)

supported on the premise that modification of software and hardware of a terrestrial network UE is minimized, thereby effectively avoiding extra maintenance cost of software and hardware.

18 Claims, 2 Drawing Sheets

(51) Int. Cl.
*H04B 7/19* (2006.01)
*H04W 84/06* (2009.01)

(52) U.S. Cl.
CPC ....... *H04W 56/006* (2013.01); *H04W 56/009* (2013.01); *H04W 84/06* (2013.01)

(56) References Cited

U.S. PATENT DOCUMENTS

| | | | |
|---|---|---|---|
| 2006/0281476 A1 | 12/2006 | Lane et al. | |
| 2011/0103499 A1* | 5/2011 | Cheng | H04W 56/0005 455/517 |
| 2011/0222428 A1 | 9/2011 | Charbit et al. | |
| 2011/0274031 A1 | 11/2011 | Gaal et al. | |
| 2012/0258733 A1* | 10/2012 | Fischer | H04W 4/029 455/456.1 |
| 2012/0281680 A1* | 11/2012 | Bostrom | H04W 72/082 370/336 |
| 2013/0142106 A1 | 6/2013 | Zhang et al. | |
| 2015/0009949 A1* | 1/2015 | Khoryaev | H04W 88/02 370/329 |
| 2015/0271723 A1 | 9/2015 | Yang et al. | |
| 2015/0327229 A1 | 11/2015 | Zhang et al. | |
| 2016/0028533 A1* | 1/2016 | Kazmi | H04L 5/16 370/296 |
| 2016/0094315 A1 | 3/2016 | Noh et al. | |
| 2016/0278033 A1 | 9/2016 | Wu et al. | |
| 2018/0070369 A1* | 3/2018 | Papasakellariou | H04W 56/00 |
| 2018/0241464 A1 | 8/2018 | Michaels | |
| 2018/0270811 A1* | 9/2018 | Timm | H04W 4/06 |
| 2019/0045477 A1* | 2/2019 | Edge | H04W 64/00 |
| 2019/0053159 A1* | 2/2019 | Wei | H04W 52/0225 |
| 2019/0141755 A1* | 5/2019 | Bai | H04L 5/0048 |
| 2019/0159149 A1* | 5/2019 | Ryu | H04W 56/0045 |
| 2019/0173655 A1 | 6/2019 | Shimezawa | |
| 2019/0342845 A1* | 11/2019 | Laselva | H04B 7/18504 |
| 2020/0236693 A1* | 7/2020 | Xing | H04W 72/1263 |
| 2020/0267753 A1* | 8/2020 | Adjakple | H04W 72/14 |
| 2021/0068092 A1* | 3/2021 | Abedini | H04W 72/044 |
| 2021/0185670 A1* | 6/2021 | Taherzadeh Boroujeni | H04L 5/0035 |
| 2021/0227481 A1* | 7/2021 | Xu | H04B 7/18504 |
| 2021/0227544 A1* | 7/2021 | Luo | H04L 5/0091 |
| 2021/0314889 A1* | 10/2021 | Rico Alvarino | H04W 56/0065 |
| 2021/0314892 A1* | 10/2021 | Rico Alvarino | H04W 74/0833 |
| 2021/0321353 A1 | 10/2021 | Muruganathan et al. | |
| 2022/0232503 A1* | 7/2022 | Cheng | H04W 56/0045 |
| 2023/0292371 A1* | 9/2023 | Rune | H04W 74/006 370/328 |

FOREIGN PATENT DOCUMENTS

| | | |
|---|---|---|
| CN | 103313380 A | 9/2013 |
| CN | 103346829 A | 10/2013 |
| CN | 103379435 A | 10/2013 |
| CN | 103702408 A | 4/2014 |
| CN | 107197517 A | 9/2017 |
| JP | 2000269876 A | 9/2000 |
| JP | 2008544647 A | 12/2008 |
| JP | 2018512786 A | 5/2018 |
| WO | 2018030049 A1 | 2/2018 |
| WO | 2020031155 A1 | 2/2020 |

OTHER PUBLICATIONS

International Search Report for International Application No. PCT/CN2019/096463; dated Sep. 27, 2019.
Spreadtrum Communications, "Impacts Casued by Measurement Variations in NTN", 3GPP TSG-RAN WG2 Meeting #106, R2-1905688/R2-1903797, Reno, US, May 13-17, 2019; 3 pages.
EPO Extended Duropean Search Report for corresponding EP Application No. 19854728.3; dated Apr. 20, 2022.
Guidotti et al., "Architectures and Key Technical Challenges for 5G Systems Incorporating Satellites", arxiv.org, Cornell University Library, New York; Jun. 6, 2018; 1 page.
IPIN Office Action for corresponding Indian Application No. 202117009789; dated Jan. 31, 2022.
ZTE et al., "Discussion on the NR impacts on random access for NTN", 3GPP TSG RAN WG1 Meeting #92bis; R1-1804236; Apr. 16-20, 2018; 3 pages.
IPO Notice of Reasons for Refusal for corresponding JP Application No. 2021-510777; dated Jun. 21, 2022.
Thales et al., "NR-NTN: Preliminary solutions for NR to support non-terrestrial networks", 3GPP TSG RAN Meeting #80, RP-180664, Jun. 11-14, 2018; 16 pages.
JPO Decision of Refusal for corresponding JP Application No. 2021-510777; dated Jan. 10, 2023.
JPO Reconsideration Report by Examiner before Appeal for corresponding JP Application No. 2021-510777; dated Jul. 13, 2023.

* cited by examiner

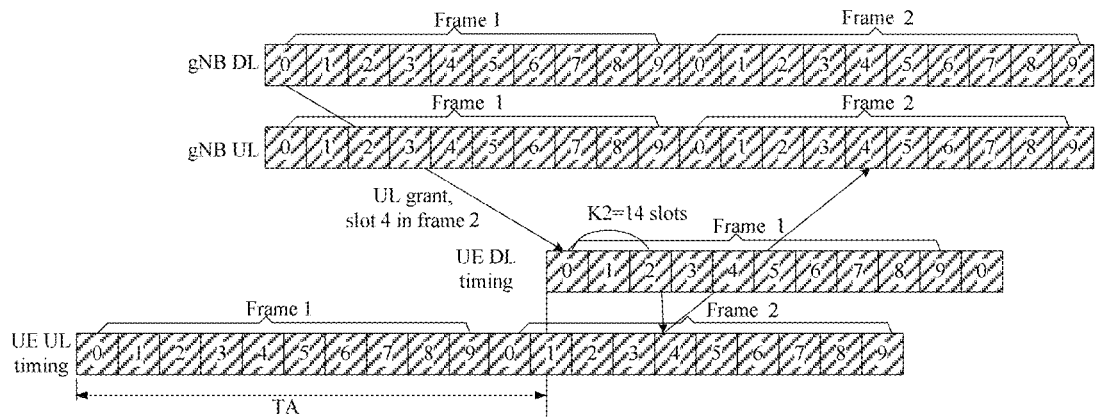

FIG. 1 (prior art)

```
┌─────────────────────────────────────────────────────┐
│ a minimum round trip time between each UE in a cell │  S101
│ and a satellite is determined                       │
└─────────────────────────────────────────────────────┘
                          │
┌─────────────────────────────────────────────────────┐
│ frame information of a network-side uplink radio    │
│ frame is determined based on the minimum round trip │
│ time and frame information of a network-side        │  S102
│ downlink radio frame, where the minimum round trip  │
│ time is a timing difference by which the network-   │
│ side uplink radio frame lags behind the network-    │
│ side downlink radio frame                           │
└─────────────────────────────────────────────────────┘
                          │
┌─────────────────────────────────────────────────────┐
│ a UE parameter of each UE is determined based on    │
│ the network-side uplink radio frame and the         │  S103
│ network-side downlink radio frame, where the UE     │
│ parameter includes at least one of TA or K2         │
└─────────────────────────────────────────────────────┘
```

FIG. 2

USER EQUIPMENT PARAMETER DETERMINATION METHOD AND APPARATUS, AND STORAGE MEDIUM AND BASE STATION

CROSS-REFERENCE TO RELATED APPLICATIONS

This is the U.S. national stage of Application No. PCT/CN2019/096463, filed on Jul. 18, 2019, Priority under 35 U.S.C. § 119(a) and 35 U.S.C. § 365(b) is claimed from Chinese Patent Application No. 201811012648.5, filed on Aug. 31, 2018, the entire disclosure of which is incorporated herein by reference.

TECHNICAL FIELD

The present disclosure generally relates to radio communication technology field, and more particularly, to a User Equipment (UE) parameter determination method and apparatus, a storage medium and a base station.

BACKGROUND

The 3rd Generation Partnership Project (3GPP) is studying Non Terrestrial Network (NTN) in the Fifth-Generation mobile communications (5G) New Radio (NR). A research scope of 5G NTN mainly includes Spaceborne vehicles, such as Geostationary Earth Orbit Satellites (GEO), Medium Earth Orbit Satellites (MEO) and Low Earth Orbit Satellites (LEO), and airborne vehicle High Altitude Platforms (HAPS). A main feature of NTN lies in that its Round Trip Time (RTT) is relatively long, generally ranging from a few milliseconds to hundreds of milliseconds. One-way delays of different NTN deployment scenarios are shown in Table 1. An RTT is twice the one-way delay. Further, Table 1 also lists relevant parameters of terrestrial network cellular communication with a radius of 10 kilometers (km for short).

TABLE 1

|  | deployment-D1 | deployment-D2 | deployment-D3 | deployment-D4 | deployment-D5 | cellular (radius of 10 km) |
|---|---|---|---|---|---|---|
| platform track altitude | GEO located at 35786 km | GEO located at 35786 km | Non GEO located below 600 km | Non GEO located below 600 km | airborne vehicle located above 20 km |  |
| frequency band | Ka frequency band | S frequency band | S frequency band | Ka frequency band | S frequency band (lower than 6 GHz) | S frequency band |
| maximum one-way delay (ms) | bent-pipe: 272.37 spaceborne gNB: 135.28 | 272.37 | 14.204 | 14.204 | 1.526 | 0.03333 |
| maximum delay edge to difference (ms) | 16 (satellite covers from edge to center point) | 16 (satellite covers from edge to center point) | 4.44 (satellite covers from edge to center point) | 4.44 (satellite covers from edge to center point) | 0.697 (satellite covers from edge to center point) | 0.00333 (cell center to edge) equals to the maximum delay |

Currently, it has been proposed to divide Timing Advance (TA) into a specific TA part for each User Equipment (UE) and a fixed TA part applicable to all UEs. The fixed TA part applicable to all UEs can be transmitted to the UE through system information. A similar solution may also be adopted for a time (abbreviated as K2) from a slot where an uplink resource carrying Uplink (UL) grant indication information is located to a slot where a resource of a UL grant is located. However, a disadvantage lies in that communication protocols need to be modified to add the fixed parts of TA and K2. For terrestrial network UEs, in order to support NTN communication, it is further required to implement relevant software and hardware updates (for example, increase variables and applications, check whether a value range of relevant variables will overflow, etc.), which may require additional maintenance of relevant software and hardware management branches and accordingly increase maintenance cost of the software and hardware.

Therefore, to realize NTN communication, how to determine UE parameters (for example, TA and/or K2) still needs further study.

SUMMARY

Embodiments of the present disclosure provide solutions for determining UE parameters such as TA and/or K2 to minimize modification to protocols and maintenance cost of software and hardware.

In an embodiment of the present disclosure, a UE parameter determination method is provided, including: determining a minimum round trip time between each UE in a cell and a satellite; determining frame information of a network-side uplink radio frame based on the minimum round trip time and frame information of a network-side downlink radio frame, where the minimum round trip time is a timing difference by which the network-side uplink radio frame lags behind the network-side downlink radio frame; and determining a UE parameter of each UE based on the network-side uplink radio frame and the network-side downlink radio frame, where the UE parameter includes at least one of TA or K2.

Optionally, determining the minimum round trip time between each UE in the cell and the satellite includes: determining the minimum round trip time between each UE in the cell and the satellite based on an altitude of the satellite.

Optionally, the minimum round trip time is counted by time slot, and is obtained by rounding down over time slot;

or, the minimum round trip time is counted by subframe, and is obtained by rounding down over subframe.

Optionally, the minimum round trip time is transparent to each UE.

Optionally, the UE parameter is TA, and determining the UE parameter of each UE based on the network-side uplink radio frame and the network-side downlink radio frame includes: receiving an uplink signal from each UE; and calculating the TA of each UE based on the uplink signal, the network-side downlink radio frame and the network-side uplink radio frame.

Optionally, the UE parameter is K2, and determining the UE parameter of each UE based on the network-side uplink radio frame and the network-side downlink radio frame includes: when performing uplink scheduling for each UE, calculating the K2 of each UE based on the network-side uplink radio frame and the network-side downlink radio frame.

In an embodiment of the present disclosure, a UE parameter determination apparatus is provided, including: a first determining circuitry configured to determine a minimum round trip time between each UE in a cell and a satellite; a second determining circuitry configured to determine frame information of a network-side uplink radio frame based on the minimum round trip time and frame information of a network-side downlink radio frame, where the minimum round trip time is a timing difference by which the network-side uplink radio frame lags behind the network-side downlink radio frame; and a third determining circuitry configured to determine a UE parameter of each UE based on the network-side uplink radio frame and the network-side downlink radio frame, where the UE parameter includes at least one of TA or K2.

Optionally, the first determining circuitry includes: a determining sub-circuitry configured to determine the minimum round trip time between each UE in the cell and the satellite based on an altitude of the satellite.

Optionally, the minimum round trip time is counted by time slot, and is obtained by rounding down over time slot; or, the minimum round trip time is counted by subframe, and is obtained by rounding down over subframe.

Optionally, the minimum round trip time is transparent to each UE.

Optionally, the UE parameter is TA, and the third determining circuitry includes: a receiving sub-circuitry configured to receive an uplink signal from each UE; and a first calculating sub-circuitry configured to calculate the TA of each UE based on the uplink signal, the network-side downlink radio frame and the network-side uplink radio frame.

Optionally, the UE parameter is K2, and the third determining circuitry includes: a second calculating sub-circuitry configured to: when uplink scheduling is performed for each UE, calculate the K2 of each UE based on the network-side uplink radio frame and the network-side downlink radio frame.

In an embodiment of the present disclosure, a storage medium having computer instructions stored therein is provided, wherein when the computer instructions are executed, the above UE parameter determination method is performed.

In an embodiment of the present disclosure, a base station including a memory and a processor is provided, wherein the memory has computer instructions stored therein, and when the processor executes the computer instructions, the above UE parameter determination method is performed.

Embodiments of the present disclosure may provide following advantages.

In an embodiment of the present disclosure, a UE parameter determination method is provided, including: determining a minimum round trip time between each UE in a cell and a satellite; determining frame information of a network-side uplink radio frame based on the minimum round trip time and frame information of a network-side downlink radio frame, where the minimum round trip time is a timing difference by which the network-side uplink radio frame lags behind the network-side downlink radio frame; and determining a UE parameter of each UE based on the network-side uplink radio frame and the network-side downlink radio frame, where the UE parameter includes at least one of TA or K2. By the embodiment of the present disclosure, the minimum round trip time may be taken as the timing difference by which the network-side uplink radio frame lags behind the network-side downlink radio frame, so as to obtain the network-side uplink radio frame, and determine the value of TA and/or K2 based on the network-side uplink radio frame. Further, the UE may transmit and receive data based on the network-side uplink radio frame and the network-side downlink radio frame. An ultra-long round trip time in NTN is adjusted through a network to minimize modification of software and hardware of a terrestrial network UE, which may effectively avoid extra maintenance cost of software and hardware of the UE, i.e., NTN communication is supported.

Further, the minimum round trip time is transparent to each UE. By the embodiment of the present disclosure, the UE does not need to know the minimum round trip time, and the TA and K2 of the NTN UE may become relatively small by introducing the timing difference between the network-side uplink radio frame and the network-side downlink radio frame, which may minimize modification to related protocols and reduce maintenance cost of UE.

BRIEF DESCRIPTION OF THE DRAWINGS

FIG. 1 is a scenario diagram of a UE parameter determination method in existing techniques;

FIG. 2 is a flow chart of a UE parameter determination method according to an embodiment;

DETAILED DESCRIPTION

Figure 3:
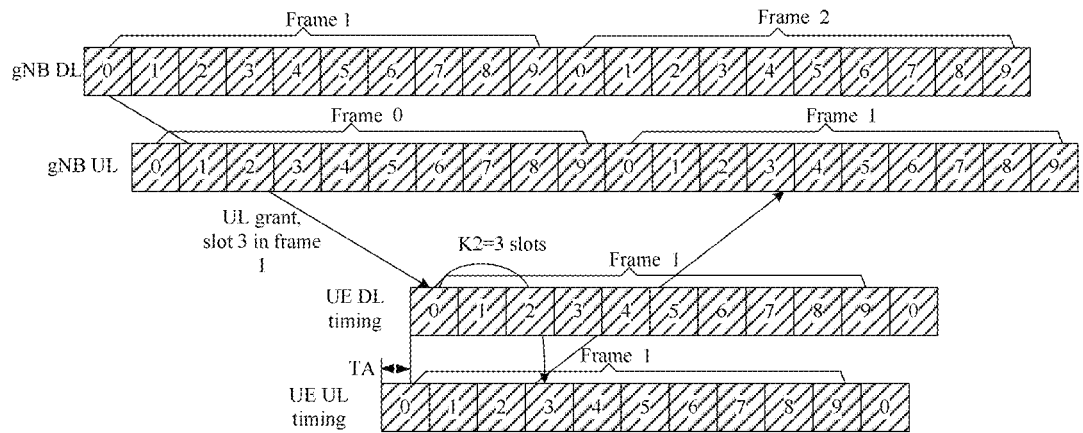
FIG. 3 is a scenario diagram of a UE parameter determination method according to an embodiment.

As described in the background, in the existing techniques, TA is divided into a specific TA part for each UE and a fixed TA part applicable to all UEs, and the fixed TA part is transmitted through system information. Similarly, a similar solution may also be adopted for a time (abbreviated as K2) from a slot where an uplink resource of UL grant indication is located to a slot when a UL grant is received. However, existing TA and K2 determination methods may cause the value of TA and K2 to greatly exceed a range of TA and K2 currently defined in the terrestrial network.

Taking a subcarrier interval of 15 kHz as an example, as shown in FIG. 1, a one-way transmission delay from a slot 0 of a frame of a network base station (for example, gNodeB (gNB)) to a time when a UE receives the frame is more than 5 ms, and an RTT between the gNB and the UE is more than 11 ms.

To achieve uplink timing synchronization, the gNB configures TA for the UE, so that the UE can complete uplink transmission in a desired time slot. Taking into account the RTT, the UE performs uplink data transmission more than 11 ms in advance (that is, TA compensates about 11 ms), so that an uplink signal of the UE can be aligned with an uplink frame of the network base station side when the uplink signal of the UE reaches the network base station. Further, a UL grant received by the UE in time slot 0 of frame 1 indicates that the UE can transmit data in time slot 4 of frame 2, and a value of K2 should be 14 time slots.

With the existing technical solutions, a minimum RTT between the gNB and the UE may be used as the fixed TA part and broadcast through system information, and the specific TA part may be notified to each UE by the gNB through a Timing Advance Command. The same processing applies to K2. Similarly, an interval of other subcarriers can be deduced by analogy and is not repeated here. It can be seen that the existing technical solutions require modification to protocols. Moreover, for the UE, in order to support NTN communication, it is further required to implement relevant software and hardware updates and maintain relevant variables, which increases maintenance cost of software and hardware.

In an embodiment of the present disclosure, a UE parameter determination method is provided, including: determining a minimum round trip time between each UE in a cell and a satellite; determining frame information of a network-side uplink radio frame based on the minimum round trip time and frame information of a network-side downlink radio frame, where the minimum round trip time is a timing difference by which the network-side uplink radio frame lags behind the network-side downlink radio frame; and determining a UE parameter of each UE based on the network-side uplink radio frame and the network-side downlink radio frame, where the UE parameter includes at least one of TA or K2.

By the embodiment of the present disclosure, the minimum round trip time may be taken as the timing difference by which the network-side uplink radio frame lags behind the network-side downlink radio frame, so as to obtain the network-side uplink radio frame, and determine the value of TA and/or K2 based on the network-side uplink radio frame. Further, the UE may transmit and receive data based on the network-side uplink radio frame and the network-side downlink radio frame. An ultra-long round trip time in NTN is adjusted through a network to minimize modification of software and hardware of a terrestrial network UE, which may effectively avoid extra maintenance cost of software and hardware of the UE, i.e., NTN communication is supported.

In order to clarify the objects, characteristics and advantages of the disclosure, embodiments of present disclosure will be described in detail in conjunction with accompanying drawings.

FIG. 2 is a flow chart of a UE parameter determination method according to an embodiment.

To ensure timing synchronization of a base station on a network side, the network may balance different transmission delays by adjusting uplink timing of each UE, so that uplink signals of each UE can reach the base station synchronously. For example, compared to UEs that are closer to the base station, UEs that are farther from the base station have a longer transmission time, thus, the UEs that are farther from the base station need to transmit uplink data in advance. A timing for transmitting in advance is calculated by the base station and notified to the UE. Specifically, the base station may configure TA for each UE and transmit it to the UE, and the UE adjusts an uplink data transmission timing based on the TA, thereby realizing timing synchronization on the base station side. In NTN communication, as an RTT between the base station and the UE is much larger than an RTT between a base station and a UE in terrestrial network communication, a value range of TA and/or K2 greatly exceeds the currently defined value range.

Therefore, an embodiment of the present disclosure provides a UE parameter determination method including S101, S102 and S103.

In S101, a minimum round trip time between each UE in a cell and a satellite is determined.

In S102, frame information of a network-side uplink radio frame is determined based on the minimum round trip time and frame information of a network-side downlink radio frame, where the minimum round trip time is a timing difference by which the network-side uplink radio frame lags behind the network-side downlink radio frame.

In S103, a UE parameter of each UE is determined based on the network-side uplink radio frame and the network-side downlink radio frame, where the UE parameter includes at least one of TA or K2. Specifically, the UE parameter of each UE may be determined based on timing of the network-side uplink radio frame and timing of the network-side downlink radio frame.

In some embodiments, in S101, an NTN base station may determine a round trip time between each UE in the cell and the satellite, so as to obtain a minimum round trip time between the base station and the UE.

In some embodiments, the NTN base station may determine the minimum round trip time between each UE in the cell and the satellite based on an altitude of the satellite. For example, compare a round trip time between each UE and the satellite to obtain the minimum round trip time. Preferably, the NTN base station may assume that a particular UE is located at a terrestrial plane position closest to the satellite, and determine the round trip time between the particular UE and the satellite as the minimum round trip time.

In S102, the NTN base station may determine the frame information of the network-side uplink radio frame based on the minimum round trip time and the frame information of the network-side downlink radio frame. Those skilled in the art could understand that for terrestrial networks, the network does not distinguish network-side downlink radio frames and network-side uplink radio frames, and merely uses network-side radio frames as a reference for data transmission and reception.

In NTN communication, the base station may determine the network-side downlink radio frame and the network-side uplink radio frame for the network side. The frame information of the network-side downlink radio frame and the network-side uplink radio frame may be different. The network-side uplink radio frame lags behind the network-side downlink radio frame.

Specifically, uplink and downlink timings of the NTN base station are different, and the frame information of the network-side uplink radio frame may be determined based on the minimum round trip time and the frame information of the network-side downlink radio frame. The frame information may include one or more items of information such as frame number, time slot number, index information of subframe number, and the number of time slots included in the radio frame. Those skilled in the art understand that in actual applications, in the NTN base station, the frame information of the network-side uplink radio frame may be changed according to changes in specific applications, which is not described in detail here.

In some embodiments, the timing difference by which the network-side uplink radio frame lags behind the network-side downlink radio frame may be the minimum round trip time. After the frame information of the network-side downlink radio frame is determined, the minimum round trip time may be delayed to obtain the frame information of the network-side uplink radio frame.

In some embodiments, for the network side, the network-side uplink and downlink radio frames have different timings. For a particular moment, taking a time slot in the radio frame as an example, a frame number of the network-side downlink radio frame may be different from a frame number of the network-side uplink radio frame at that moment, and a time slot number in the network-side downlink radio frame may be also different from a time slot number in the network-side uplink radio frame.

The frame numbers and time slot numbers of the network-side uplink radio frame and the network-side downlink radio frame may be different. As shown in FIG. 3, taking 15 kHz as an example, each frame includes 10 time slots, from time slot 0 to time slot 9. gNB transmits a UL grant in time slot 0 of frame 1 to instruct a UE to perform uplink transmission in time slot 3 of frame 1, where K2 is 3 time slots, and is determined based on the network-side downlink radio frame and the network-side uplink radio frame. A network-side uplink radio frame timing lags behind a network-side downlink radio frame timing, where a lag time may be the minimum round trip time, or may be a result of rounding down over time slot.

Alternatively, for a particular moment, taking subframes in radio frames as an example, frame numbers of the network-side uplink radio frame and the network-side downlink radio frame at that moment may be different, and subframe numbers in the network-side downlink radio frame and in the network-side uplink radio frame may be also different.

Further, the minimum RTT may be counted in time slot. Generally, a duration of each time slot is 1 ms. Those skilled in the art could understand that the minimum RTT is obtained by rounding down over time slot to determine the network-side uplink radio frame. Alternatively, the minimum RTT may be counted in subframe. Those skilled in the art could understand that the minimum RTT is obtained by rounding down over subframe to determine the network-side uplink radio frame.

Further, the NTN base station may determine a TA value with a smaller time slot or subframe based on an existing calculation method and notify the TA value to the UE. For simplicity, a specific calculation process is not described here.

Further, in S103, an uplink and downlink timing difference of the NTN base station is transparent to the NTN UE. That is, the UE does not need to know that a difference exists between the uplink and downlink timing of the NTN base station.

Specifically, the NTN base station may use an uplink signal transmitted by the UE, the network-side uplink radio frame and the network-side downlink radio frame to calculate the TA. In some embodiments, the NTN base station may determine the value of TA by measuring a received random access preamble when the UE performs random access. When determining the TA of the UE, the NTN base station calculates it based on the network-side uplink radio frame, that is, when the NTN base station calculates the TA, the minimum round trip time (i.e., the timing difference by which the network-side uplink radio frame lags behind the network-side downlink radio frame) is deducted. Generally, after deducting the timing difference, the NTN base station may calculate the TA based on the measured random access preamble. In this way, the calculated TA value is relatively small, thereby minimizing the modification of existing protocols.

Those skilled in the art could understand that, for the NTN network, a step for determining K2 is similar to the step of determining TA. When performing UL scheduling on the UE, the NTN base station may deduct the minimum round trip time. Specifically, the NTN base station may calculate the value of K2 after deducting the timing difference by which the network-side uplink radio frame lags behind the network-side downlink radio frame, and a specific calculation process is not described here.

Afterward, the NTN base station may transmit the calculation result (i.e., the determined TA) to the UE through a Timing Advance Command. Generally, the NTN base station may transmit the calculation result to the UE through a timing advance command field of a random access response.

From above, with the technical solutions provided by the embodiments of the present disclosure, the UE parameters TA and/or K2 in the NTN network may be determined for the UE without modifying UE-side protocols Further, it is possible to minimize the modification of UE-side relevant protocols, which reduces maintenance cost of UE.

Figure 4:
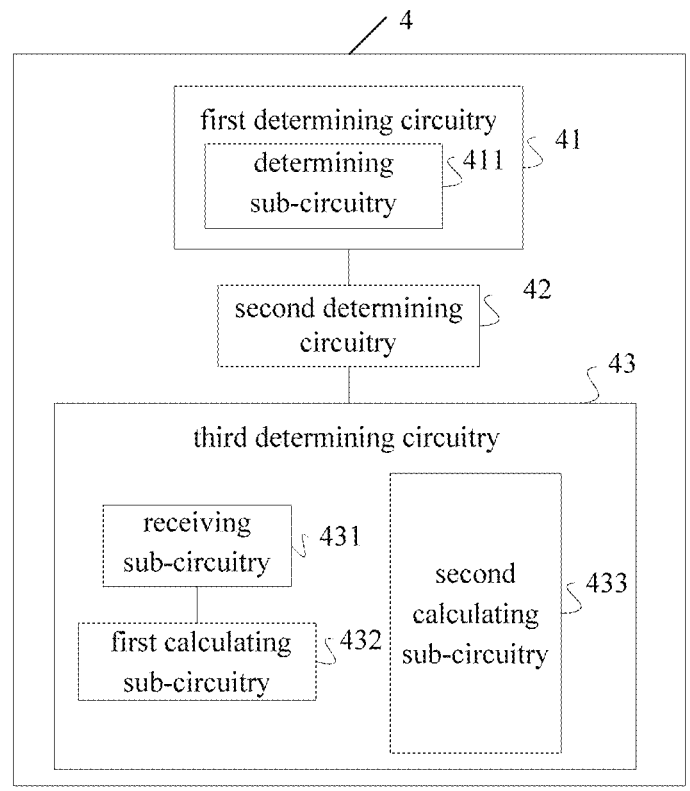
FIG. 4 is a structural diagram of a UE parameter determination apparatus according to an embodiment.

FIG. 4 is a structural diagram of a UE parameter determination apparatus according to an embodiment. The UE parameter determination apparatus 4 may be used to implement the technical solutions of the UE parameter determination method as shown in FIG. 2 and FIG. 3, and be applied to the network side, for example, at an NTN base station (for example, 5G gNB).

Specifically, the UE parameter determination apparatus 4 may include a first determining circuitry 41, a second determining circuitry 42 and a third determining circuitry 43.

The first determining circuitry 41 is configured to determine a minimum round trip time between each UE in a cell and a satellite; the second determining circuitry 42 is configured to determine frame information of a network-side uplink radio frame based on the minimum round trip time and frame information of a network-side downlink radio frame, where the minimum round trip time is a timing difference by which the network-side uplink radio frame lags behind the network-side downlink radio frame; and the third determining circuitry 43 is configured to determine a UE parameter of each UE based on the network-side uplink radio frame and the network-side downlink radio frame, where the UE parameter includes at least one of TA or K2.

In some embodiments, the first determining circuitry 41 includes a determining sub-circuitry 411.

The determining sub-circuitry 411 is configured to determine the minimum round trip time between each UE in the cell and the satellite based on an altitude of the satellite.

In some embodiments, the minimum round trip time is counted by time slot, and is obtained by rounding down over time slot; or, the minimum round trip time is counted by subframe, and is obtained by rounding down over subframe.

In some embodiments, the minimum round trip time is transparent to each UE.

In some embodiments, the UE parameter is TA, and the third determining circuitry 43 includes a receiving sub-circuitry 431 and a first calculating sub-circuitry 432.

The receiving sub-circuitry 431 is configured to receive an uplink signal from each UE; and the first calculating sub-circuitry 432 is configured to calculate the TA of each UE based on the uplink signal, the network-side downlink radio frame and the network-side uplink radio frame.

Alternatively, the UE parameter is K2, and the third determining circuitry 43 includes a second calculating sub-circuitry 433. The second calculating sub-circuitry 433 is configured to: when uplink scheduling is performed for each UE, calculate the K2 of each UE based on the network-side uplink radio frame and the network-side downlink radio frame.

More details of working principles and working modes of the UE parameter determination apparatus 4 can be found in the above descriptions of FIG. 2 and FIG. 3, and are not described here.

In an embodiment of the present disclosure, a storage medium having computer instructions stored therein is provided, wherein when the computer instructions are executed, the above UE parameter determination method as shown in FIG. 2 and FIG. 3 is performed. In some embodiments, the storage medium may include a computer readable storage medium, such as a non-volatile memory or a non-transitory memory. The computer readable storage medium may include a Read Only Memory (ROM), a Random Access Memory (RAM), a magnetic disk or an optical disk.

In an embodiment of the present disclosure, a base station including a memory and a processor is provided, wherein the memory has computer instructions stored therein, and when the processor executes the computer instructions, the above UE parameter determination method as shown in FIG. 2 and FIG. 3 is performed. In some embodiments, the base station may be a satellite base station.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A User Equipment (UE) parameter determination method, comprising:
   determining, by a base station, a minimum round trip time between each UE in a cell and a satellite, wherein the minimum round trip time is a timing difference by which a network-side uplink radio frame lags behind a network-side downlink radio frame;
   determining, by the base station, frame information of the network-side uplink radio frame based on the minimum round trip time and frame information of the network-side downlink radio frame; and
   determining, by the base station, a UE parameter of each UE based on the network-side uplink radio frame and the network-side downlink radio frame, where the UE parameter comprises at least one of Timing Advance (TA) or K2, wherein K2 is a time period from a slot where an uplink resource carrying Uplink (UL) grant indication information is located to a slot where a resource of a UL grant is located;
   wherein the UE parameter comprises TA, and said determining, by the base station, the UE parameter of each UE based on the network-side uplink radio frame and the network-side downlink radio frame comprises:
   determining the TA by deducting the minimum round trip time from a round trip time, wherein the round trip time is determined based on a random access preamble received when the UE performs random access.

2. The UE parameter determination method according to claim 1, wherein determining the minimum round trip time between each UE in the cell and the satellite comprises:
   determining the minimum round trip time between each UE in the cell and the satellite based on an altitude of the satellite.

3. The UE parameter determination method according to claim 2, wherein the minimum round trip time is counted by time slot, and is obtained by rounding down over time slot; or, the minimum round trip time is counted by subframe, and is obtained by rounding down over subframe.

4. The UE parameter determination method according to claim 2, wherein the minimum round trip time is transparent to each UE.

5. The UE parameter determination method according to claim 1, wherein the minimum round trip time is counted by time slot, and is obtained by rounding down over time slot; or, the minimum round trip time is counted by subframe, and is obtained by rounding down over subframe.

6. The UE parameter determination method according to claim 1, wherein the minimum round trip time is transparent to each UE.

7. The UE parameter determination method according to claim 1, wherein the UE parameter is TA, and determining the UE parameter of each UE based on the network-side uplink radio frame and the network-side downlink radio frame comprises:
   receiving an uplink signal from each UE; and
   calculating the TA of each UE based on the uplink signal, the network-side downlink radio frame and the network-side uplink radio frame.

8. The UE parameter determination method according to claim 1, wherein the UE parameter is K2, and determining the UE parameter of each UE based on the network-side uplink radio frame and the network-side downlink radio frame comprises:
   when performing uplink scheduling for each UE, calculating the K2 of each UE based on the network-side uplink radio frame and the network-side downlink radio frame.

9. A non-transitory storage medium having computer instructions stored therein, wherein when the computer instructions are executed, the User Equipment (UE) parameter determination method of claim 1 is performed.

10. A base station comprising a memory and a processor, wherein the memory has computer instructions stored therein, and when the processor executes the computer instructions, the User Equipment (UE) parameter determination method of claim 1 is performed.

11. A User Equipment (UE) parameter determination apparatus mounted on a base station, comprising:
   a first determining circuitry configured to determine a minimum round trip time between each UE in a cell and a satellite, wherein the minimum round trip time is a timing difference by which a network-side uplink radio frame lags behind a network-side downlink radio frame;
   a second determining circuitry configured to determine frame information of the network-side uplink radio frame based on the minimum round trip time and frame information of the network-side downlink radio frame; and
   a third determining circuitry configured to determine a UE parameter of each UE based on the network-side uplink radio frame and the network-side downlink radio frame, where the UE parameter comprises at least one of Timing Advance (TA) or K2, wherein K2 is a time period from a slot where an uplink resource carrying Uplink (UL) grant indication information is located to a slot where a resource of a UL grant is located;

wherein the UE parameter comprises TA, and the third determining circuitry is configured to:
determine the TA by deducting the minimum round trip time from a round trip time, wherein the round trip time is determined based on a random access preamble received when the UE performs random access.

12. The UE parameter determination apparatus according to claim 11, wherein the first determining circuitry comprises:
a determining sub-circuitry configured to determine the minimum round trip time between each UE in the cell and the satellite based on an altitude of the satellite.

13. The UE parameter determination apparatus according to claim 12, wherein the minimum round trip time is counted by time slot, and is obtained by rounding down over time slot; or, the minimum round trip time is counted by subframe, and is obtained by rounding down over subframe.

14. The UE parameter determination apparatus according to claim 12, wherein the minimum round trip time is transparent to each UE.

15. The UE parameter determination apparatus according to claim 11, wherein the minimum round trip time is counted by time slot, and is obtained by rounding down over time slot; or, the minimum round trip time is counted by subframe, and is obtained by rounding down over subframe.

16. The UE parameter determination apparatus according to claim 11, wherein the minimum round trip time is transparent to each UE.

17. The UE parameter determination apparatus according to claim 11, wherein the UE parameter is TA, and the third determining circuitry comprises:
a receiving sub-circuitry configured to receive an uplink signal from each UE; and
a first calculating sub-circuitry configured to calculate the TA of each UE based on the uplink signal, the network-side downlink radio frame and the network-side uplink radio frame.

18. The UE parameter determination apparatus according to claim 11, wherein the UE parameter is K2, and the third determining circuitry comprises:
a second calculating sub-circuitry configured to: when uplink scheduling is performed for each UE, calculate the K2 of each UE based on the network-side uplink radio frame and the network-side downlink radio frame.

* * * * *